United States Patent Office 3,712,858
Patented Jan. 23, 1973

3,712,858
PRODUCTION OF SODIUM
Francis Joseph Ross, Niagara Falls, N.Y., assignor to
E. I. du Pont de Nemours and Company, Wilmington, Del.
No Drawing. Filed Aug. 3, 1971, Ser. No. 168,766
Int. Cl. C22d 3/06
U.S. Cl. 204—68                              11 Claims

ABSTRACT OF THE DISCLOSURE

Quaternary salt compositions and their use in the electrolytic production of sodium are provided. These compositions consist essentially of about 30–60 percent barium chloride, about 4–35 percent calcium chloride, about 2–25 percent potassium chloride, and about 14–52 percent sodium chloride, with the total of these four components equaling 100 percent and having a first arrest point under about 620° C., preferably under 585° C. Use of preferred compositions as cell baths in a sodium cell permits the efficient production of sodium with such a reduced calcium content as to minimize or even eliminate cell tickling operations and minimize final purification and sludge recovery.

BACKGROUND OF THE INVENTION

Field of the invention

This invention relates to salt compositions and to the production of sodium from fused salt baths and more particularly to quaternary salt compositions and processes for the electrolytic production of sodium from fused salt baths of these compositions.

Prior art

Metallic sodium is usually obtained from the electrolysis of sodium chloride. This is the cheapest and most abundant salt of the metal, but melts at too high a temperature for convenient use alone in electrolytic baths. As a consequence, it is generally employed in admixture with calcium chloride (Bunsen baths), which admixture has been used commercially for a number of years. However, sodium production has been hampered by calcium impurities and over the years many attempts have been made to: (1) eliminate or minimize calcium formation by use of alternate baths, (2) minimize handling problems and purification of the sodium produced by precipitation of calcium at the cell, and use of devices to expedite return of the solid calcium to the cell, and (3) devise alternate methods of recovering or disposing of the filtered impurities.

The present invention is directed to the use of alternative baths in the cell. Cell bath compositions used for the production of sodium and containing no calcium chloride have proven inefficient due to high temperature cell operation or high cost of raw materials. Such baths are NaCl, $SrCl_2$ described in U.S. Pat. 3,119,756; NaCl, $SrCl_2$, $BaCl_2$ described in U.S. Pat. 2,850,442; NaCl, NaF, KCl, KF described in British Pat. 15,649; NaCl, $BaCl_3$, KCl described in Canadian Pat. 670,314 and British Pat. 16,060; NaCl, $SrCl_2$, KCl described in British Pat. 16,060; NaCl, NaF, $BaCl_2$ described in U.S. Pat. 841,724; NaCl, LiCl, KCl described in U.S. Pats. 3,072,544 and 3,051,635; and NaCl, KCl and $SrCl_2$ described in U.S. Pat. 464,097.

Cell bath compositions using calcium chloride, other than the Bunsen bath, produce less calcium but still rely on calcium precipitation by cooling the sodium at the cell to minimize calcium losses and handling problems. Such baths are NaCl, $BaCl_2$, $CaCl_2$ described in U.S. Pat. 3,020,221; NaCl, $BaCl_2$, $CaCl_2$, $SrCl_2$ described in U.S. Pat. 3,257,297; and NaCl, $CaCl_2$, KCl described in British Pat. 16,060.

SUMMARY OF THE INVENTION

According to the present invention there is provided a process for the production of sodium by electrolyzing with direct current a fused metal chloride salt composition contained in an electrolytic cell having the improvement comprising electrolyzing a fused metal chloride salt composition consisting essentially of about 30–60 percent by weight barium chloride, about 4–35 percent by weight calcium chloride, about 2–25 percent by weight potassium chloride and about 14–52 percent by weight sodium chloride, the total of said metal chlorides being equal to 100 percent and said composition having a first arrest point under about 620° C.

There is also provided a salt composition of mixed metal chloride salts consisting essentially of about 30–60 percent by weight barium chloride, about 4–35 percent by weight calcium chloride, about 2–25 percent by weight potassium chloride and about 14–52 percent by weight sodium chloride, the total of said metal chlorides being equal to 100 percent.

DETAILED DESCRIPTION OF THE INVENTION

In the conventional Downs cell of U.S. Pat. 1,501,756 as modified by subsequent improvements, a solution of calcium in liquid sodium is formed and rises into a sodium receiver. As this solution cools, some of the calcium precipitates and drops back into the bath. Since the precipitated calcium tends to block the pipe leading to the receiver, it is necessary to operate a stirring device, referred to in the art as a tickler, to maintain sodium flow as described, for example, by Hulse et al. in U.S. Pat. 2,068,681. Precipitated calcium also tends to cause short circuits between the diaphragms and cathodes of the electrolytic cell, decreasing diaphragm life and cell efficiency, and plug ports of standard sodium receiver.

Bath compositions shown in the prior art have been essentially optimized with respect to cost, cell operating temperature and calcium formation. Applicant, however, has improved baths heretofore known by adding potassium chloride to the bath, in addition to sodium chloride, calcium chloride and barium chloride, to increase the ratio of sodium chloride to calcium chloride. This addition will further reduce formation of calcium without materially increasing raw material cost or without detracting from the optimized cell performance.

Using the most preferred quaternary salt compositions, calcium formation in the bath is reduced until there is no precipitation of calcium metal in the cell riser pipe (less than 0.2 percent by weight), thus minimizing tickler operation and allowing true continuous tap of sodium metal as with baths containing no calcium chloride. In other words, no cooling or precipitation, which are now integral parts of cell operation, are required. Also, potassium formation in the sodium can be minimized to 1 percent by weight, or lower, which will result in sodium acceptable for most uses. If desired, the quaternary bath of the invention can be used to control the formation of potassium metal from about 200 p.p.m. to 3 percent by weight by alterning the bath composition.

The most preferred quaternary salt composition according to the present invention consists essentially of about 47–50 percent by weight barium chloride, about 14–21 percent by weight calcium chloride, about 3–10 percent by weight potassium chloride and about 27–30 percent by weight sodium chloride, the total of said metal chlorides being 100 percent. A fused salt bath of this composition will produce sodium with calcium levels in the bath heretofore unattainable and minimum levels of potassium when the cell containing the bath is operated at a temperature within the range of 580–620° C. Cell current efficiencies are at least 90 percent.

A preferred quaternary salt composition consists essentially of about 30–60 percent by weight barium chloride, about 8–30 percent by weight calcium chloride, about 3–18 percent by weight potassium chloride and about 17–45 percent by weight sodium chloride, the total of said metal chlorides being equal to 100 percent and having a first arrest point under about 620° C.; however, it should be understood that a salt composition which consists essentially of about 30–60 percent by weight barium chloride, about 4–35 percent by weight calcium chloride, about 2–25 percent by weight potassium chloride and about 14–52 percent by weight sodium chloride, the total of said metal chlorides being equal to 100 percent, and having a like first arrest point, can also be employed as the fused salt electrolyte to manufacture sodium. The first arrest point is the temperature at which crystals first appear in the melt of a salt composition. To be operable, the first arrest point should be under about 620° C. and it preferably is under about 585° C.

With the above compositions, it is preferred that a particular composition used be selected to give less than 3 percent by weight potassium metal in the fused salt composition when the cell is operated at a temperature within the range of 580–620° C. and a cell efficiency of at least 90 percent. Other than the salt compositions used in the examples, further salt compositions and their first arrest points are:

| Salt composition, wt. percent: | First arrest point |
|---|---|
| 50% $BaCl_2$, 15% $CaCl_2$, 25% NaCl, 10% KCl | 570° C |
| 40% $BaCl_2$, 18% $CaCl_2$, 30% NaCl, 12% KCl | 587° C |
| 30% $BaCl_2$, 21% $CaCl_2$, 35% NaCl, 14% KCl | 594° C |

The invention can be further understood by referring to the following examples in which parts and percentages are by weight unless otherwise indicated.

EXAMPLE 1

A conventional Downs cell was operated for 30 days at 90% current efficiency and a temperature of 600 to 610° C. with a bath composition of 48.5% $BaCl_2$, 29.0% NaCl, 18% $CaCl_2$, and 4.5% KCl which has a first arrest point between 580 and 585° C. Weight percent calcium and potassium production in the melt were 0.25 and 0.5%, respectively, with no evidence of calcium metal precipitation in the riser pipe. The tickling cycle for the cell was lengthened from 1 to 4 hours. Receivers of standard design dumped freely without normal rodding to clear calcium from the exit port.

EXAMPLES 2–5

A conventional Downs cell was operated substantially as in Example 1 except with varying bath compositions. The bath compositions used and percent impurities in the sodium are shown in Table I.

TABLE I

| Example number | Bath composition, percent | | | | First arrest point, ° C. | Impurities in Na, percent | |
|---|---|---|---|---|---|---|---|
| | $BaCl_2$ | $CaCl_2$ | NaCl | KCl | | K | Ca |
| 2 | 49.1 | 20.5 | 27.1 | 3.3 | 580–585 | .32 | .23 |
| 3 | 47.8 | 17.7 | 29.7 | 4.8 | 580–585 | .55 | .19 |
| 4 | 49.7 | 16.6 | 28.6 | 5.1 | 580–585 | .72 | .17 |
| 5 | 47.9 | 14.1 | 28.5 | 9.5 | 580–585 | 1.18 | .17 |

EXAMPLE 6

A conventional Downs cell was operated for 30 days at 90% current efficiency and 605° C. with a bath composition of 49% $BaCl_2$, 26.5% NaCl, 15% $CaCl_2$, and 9.5% KCl which has a first arrest point between 580 and 585° C. Weight percent calcium and potassium production measured in samples taken before the sodium was accumulated in the collector and riser pipe were 0.23 and 1.0%, respectively. There was no precipitation of calcium in the riser pipe.

What is claimed is:

1. In a process for the production of sodium by electrolyzing with direct current a fused metal chloride salt composition contained in an electrolytic cell the improvement comprising electrolyzing a fused metal chloride salt composition consisting essentially of about 30–60 percent by weight barium chloride, about 4–35 percent by weight calcium chloride, about 2–25 percent by weight potassium chloride and about 14–52 percent by weight sodium chloride, the total of said metal chlorides being equal to 100 percent and said composition having a first arrest point under about 620° C 2. The process of claim 1 wherein the composition consists essentially of about 30–60 percent by weight barium chloride, about 8–30 percent by weight calcium chloride, about 3–18 percent by weight potassium chloride and about 17–45 percent by weight sodium chloride, the total of said metal chlorides being equal to 100 percent.

3. The process of claim 1 wherein the fused salt composition is selected to give less than 3 percent by weight potassium in the fused salt composition at a cell temperature within the range of 580–620° C. and a cell current efficiency of at least 90 percent.

4. The process of claim 2 wherein the fused salt composition is selected to give less than 3 percent by weight potassium in the fused salt composition at a cell temperature within the range of 580–620° C. and a cell current efficiency of at least 90 percent.

5. The process of claim 1 wherein the composition consists essentially of about 47–50 percent by weight barium chloride, about 14–21 percent by weight calcium chloride, about 3–10 percent by weight potassium chloride and about 27–30 percent by weight sodium chloride, the total of said metal chlorides being 100 percent.

6. A salt composition of mixed metal chloride salts consisting essentially of about 30–60 percent by weight barium chloride, about 4–35 percent by weight calcium chloride, about 2–25 percent by weight potassium chloride and about 14–52 percent by weight sodium chloride, the total of said metal chlorides being equal to 100 percent.

7. The salt composition of claim 6 wherein the composition consists essentially of about 30–60 percent by weight barium chloride, about 8–30 percent by weight calcium chloride, about 3–18 percent by weight potassium chloride and about 17–45 percent by weight sodium chloride, the total of said metal chlorides being equal to 100 percent.

8. The salt composition of claim 6 in molten form for the electrolytic production of sodium and having a first arrest point under about 620° C.

9. The salt composition of claim 7 in molten form for the electrolytic production of sodium and having a first arrest point under about 620° C.

10. The salt composition of claim 6 wherein the composition consists essentially of about 47–50 percent by weight barium chloride, about 14–21 percent by weight calcium chloride, about 3–10 percent by weight potassium chloride and about 27–30 percent by weight sodium chloride, the total of said metal chlorides being 100 percent.

11. The salt composition of claim 10 in molten form for the electrolytic production of sodium.

References Cited

UNITED STATES PATENTS

| | | | |
|---|---|---|---|
| 3,020,221 | 2/1962 | Loftus | 204—68 |
| 3,072,544 | 1/1963 | Kroon et al. | 204—68 |
| 3,257,297 | 6/1966 | Paterson et al. | 204—68 |

JOHN H. MACK, Primary Examiner

D. R. VALENTINE, Assistant Examiner